United States Patent
Scheibe

(10) Patent No.: US 9,115,820 B2
(45) Date of Patent: Aug. 25, 2015

(54) FLUIDIC CONTROL ELEMENT WITH ROUNDED SHAFT

(71) Applicant: Buerkert Werke GmbH, Ingelfingen (DE)

(72) Inventor: Ralf Scheibe, Kuenzelsau (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 170 days.

(21) Appl. No.: 13/865,862

(22) Filed: Apr. 18, 2013

(65) Prior Publication Data

US 2013/0277592 A1    Oct. 24, 2013

(30) Foreign Application Priority Data

Apr. 20, 2012    (DE) .................... 20 2012 004 020 U

(51) Int. Cl.
  *F16K 37/00*    (2006.01)
  *F16K 11/052*   (2006.01)

(52) U.S. Cl.
  CPC ......... *F16K 37/0033* (2013.01); *F16K 11/0525* (2013.01)

(58) Field of Classification Search
  CPC ............ F16K 37/0033; F16K 11/0525; F16K 31/0655; F16K 31/0658; F16K 27/0272; F16K 31/0682; F16K 11/052; H01F 7/1638
  USPC ............... 251/129.16, 129.2, 129.17–129.18; 137/375, 625.44
  See application file for complete search history.

(56) References Cited

U.S. PATENT DOCUMENTS

| | | | | |
|---|---|---|---|---|
| 2,461,772 | A | * | 2/1949 | Ray .......................... 251/129.16 |
| 2,562,631 | A | * | 7/1951 | Morrison ................. 251/129.17 |
| 3,334,650 | A | * | 8/1967 | Stewart, Jr. et al. .......... 137/375 |
| 4,274,436 | A | * | 6/1981 | Smith ........................ 137/515.7 |
| 4,777,977 | A | * | 10/1988 | Platusich ..................... 137/375 |
| 5,027,857 | A | * | 7/1991 | Champseix ............. 137/625.44 |
| 5,040,567 | A | * | 8/1991 | Nestler et al. ............ 137/625.44 |
| 5,205,323 | A | | 4/1993 | Baker |
| 5,275,387 | A | * | 1/1994 | Cotter et al. .................. 277/575 |
| 5,711,346 | A | | 1/1998 | Pieloth et al. |
| 6,186,175 | B1 | | 2/2001 | Frisch et al. |
| 6,394,136 | B1 | | 5/2002 | Rohrbeck |

(Continued)

FOREIGN PATENT DOCUMENTS

| | | |
|---|---|---|
| DE | 3940099 A1 | 6/1991 |
| DE | 20119401 U1 | 5/2002 |

(Continued)

OTHER PUBLICATIONS

Kaufman et al., WO 2008/141690 English Translation, Nov. 2008.*

(Continued)

*Primary Examiner* — John Bastianelli
(74) *Attorney, Agent, or Firm* — Stolowitz Ford Cowger LLP

(57) ABSTRACT

A fluidic control element includes a housing having a fluid space formed between at least two housing parts. First and second flow channels may each have a sealing seat that opens into the fluid space. The fluidic control element may further include a two-armed lever which is configured to swivel in the fluid space. Each arm of the lever may be configured to open and close one of the flow channels in a corresponding end position. Additionally, a valve body may have a load-carrying core including a shaft mounted in the housing. The shaft may be rounded at least in the region in which it is embedded in a sealing ring that surrounds the lever arms.

28 Claims, 4 Drawing Sheets

(56) References Cited

U.S. PATENT DOCUMENTS

| | | | |
|---|---|---|---|
| 7,104,254 B2 * | 9/2006 | Arai et al. ................ | 251/129.01 |
| 2001/0047828 A1 | 12/2001 | Berger et al. | |
| 2009/0146091 A1 | 6/2009 | Ams et al. | |
| 2009/0309055 A1 | 12/2009 | Scheibe | |

FOREIGN PATENT DOCUMENTS

| | | |
|---|---|---|
| DE | 4308678 B4 | 6/2004 |
| EP | 0741248 B1 | 4/1996 |
| EP | 0933569 A2 | 2/1999 |
| EP | 1026407 A1 | 2/2000 |
| EP | 1158182 B1 | 5/2000 |
| EP | 1316749 A2 | 11/2002 |
| EP | 1899634 B1 | 6/2006 |
| EP | 2068056 A1 | 12/2007 |
| WO | 2008141690 A1 | 11/2008 |

OTHER PUBLICATIONS

German Patent Office, Search Report for DE 20 2012 004 020.0, dated Apr. 16, 2013, 6 pages.

* cited by examiner ced in the sealing sheath have a rounded design.
FLUIDIC CONTROL ELEMENT WITH ROUNDED SHAFT

CROSS-REFERENCE TO RELATED APPLICATION

This application claims priority to German Patent Application Serial No. 202012004020.0, filed on Apr. 20, 2012, the contents of which are herein incorporated by reference in their entirety.

FIELD OF THE INVENTION

The invention relates to a fluidic control element comprising a housing composed of at least two housing parts, a fluid space being formed between the housing parts and at least first and second flow channels each comprising a sealing seat opening into said fluid space, and comprising a valve body which can be swiveled in the fluid space.

The invention particularly refers to fluidic control element being a part of a magnet valve.

BACKGROUND

A generic control element is known from EP 1 026 407 B1. Such control elements are used in particular for valves with so-called media separation which are used, for instance, in food or analysis technology, in laboratories or in medical engineering. The fluidic control element is part of a so-called direct-acting rocker magnet valve to which a torque, in particular via a magnetic actuator, is immediately applied from outside to the two-armed lever, also referred to as a rocker.

Fluidic control elements of the type initially mentioned and hence fluidic control elements according to the invention, too, can be used for blocking, passing, restricting, changing, mixing or distributing fluid flows.

The particular aspect of such fluidic control elements of the type initially mentioned is the combined sealing and actuating element. This element is clamped between the two housing parts. Its sealing sheath comprises a sealing ring which is clamped like an O-ring between the housing parts and seals the fluid space in the region of the parting plane of the housing parts. The load-carrying core comprises a shaft which extends through the sealing ring towards outside so that a torque is applied to the shaft from outside. Within the fluid space, the two lever arms stick out from the shaft in opposite directions. Originating from the shaft, the core may also extend into the lever arms in order to give them a higher elasticity. The elastic sealing sheath may completely surround the entire core situated in the fluid space, but this is not compulsory. The sealing sheath, however, is present at least in the region of the sealing seats so as to be able to reliably close the sealing seat with an elastic pressure face. These options do not only apply to prior art, but also for the control element according to the invention explained below.

Upon swiveling the lever, the elastic sealing sheath is deformed so that it provides for a restoring force. However, this involves a permanent load on the sealing sheath.

The cores used hitherto are formed as punched parts around which the sealing sheath is applied by insert molding or vulcanization. The cross-section of the shaft in the region of the passage through the sealing ring is a rectangular one. In the region where the shaft passes through the sealing ring, the latter is subject to high loads and may tear over the years.

It is the object of the invention to improve a fluidic control element such that the valve body possesses a longer product life.

SUMMARY

The fluidic control element according to the present invention comprises a housing composed of at least two housing parts, a fluid space being formed between the housing parts and at least first and second flow channels each comprising a sealing seat opening into said fluid space, and a valve body defined by a two-armed lever which can be swiveled in the fluid space and defines a combined sealing and actuating element, each arm of the lever being capable of closing and opening its associated flow channel in a corresponding end position. The valve body has a load-carrying core including a shaft mounted in the housing and an elastic sealing sheath surrounding the core in sections, the shaft being embedded in the sealing sheath at least in the region of its mounting in the housing. The sealing sheath comprises a formed-on sealing ring which is clamped between the housing parts and surrounds the lever arms. The shaft is rounded at least in the region in which it is embedded in the sealing ring and adjoins the sealing ring.

Whereas rectangular, sharp-edged cross-sectional profiles have usually been used for hitherto existing cores in order to achieve a good embedding in the sealing sheath, the invention chooses the opposite solution. Due to rounding off, there are no sharp edges or borders, i.e. edges or borders defined by immediately intersecting, in particularly flat surfaces, because the edges are always rounded, if present. This means that there will also be no tearing in the sealing sheath originating from these sharp edges.

In the control element according to the invention, there are no sharp edges at least in the region where the shaft passes through the sealing ring, preferably in the entire region of the shaft in which it is embedded in the sealing sheath.

The preferred embodiment even makes provision that all portions of the shaft which are situated in the sealing sheath and adjoin the sealing sheath are rounded, i.e. do not have any sharp corners or edges.

Although the highest loads on the sealing sheath exist in particular in the region of the shaft during swiveling the lever, one embodiment of the invention makes provision that all portions of the core which are situated in the sealing sheath and adjoin the sealing sheath have a rounded design.

As already explained, the core may have protrusions which originate from the shaft and stabilize the lever arms. This means that the shaft merges into these protrusions, for instance in one piece, so that a direct torque transmission from the shaft to the lever arms is achieved.

The protrusions may be embedded in the sealing sheath on all sides, i.e. the entire region of the valve body which comes into contact with the fluid is covered with the elastic material.

Outside the fluid space, at least one actuating arm should be formed on the shaft; it is preferred that two actuation arms pointing in opposite directions are formed on both shaft ends.

The actuation arm(s) may comprise an angled stabilization rib which is produced, for instance, by bending the core made of sheet metal.

The core can be produced as a punched part and hence at very low cost.

The borders of the core are rounded in particular by mechanical, chemical and/or electrochemical or physical ways and means, for instance by means of grinding, sandblasting, etching, eroding or electrochemical machining or combinations thereof.

A variant of the processing of the core for rounding it is that the shaft has a multi-layered design in the region of the passage through the sealing ring, including a multi-part design. Here, a load-carrying inner part (also referred to as inner core) is provided, for instance a punched part, to the outside of which a rounded cladding is applied, in particular made of plastic. This cladding can be formed, for instance, by insert-molding the inner part in this region or by coating the inner part, for instance with plastic, or by fastening a prefabricated part.

In order to optimize the embedding of the shaft in the sealing sheath and to prevent a gap occurring between the sealing sheath and the shaft during swiveling the valve body, it is preferred that there is a material bond between the sealing sheath and the shaft, preferably even between the sealing sheath and the entire core.

The preferred embodiment of the invention makes provision that the sealing ring has a self-reinforcing sealing geometry comprising beads projecting in the region of the surface of contact with the housing parts. These beads produce undercuts in which the fluid exerts a pressure on the bead, pressing the latter against the surface of contact with higher force.

With the embodiment in which a sheet metal is used as a load-carrying inner part, it is of advantage to coat it by powder coating technology, in particular with PTFE, prior to embedding it in the sealing sheath.

As an alternative to making the core or inner core of metal, it may also be manufactured from hard plastic or can be a bent sheet metal part.

DETAILED DESCRIPTION

Figure 1:
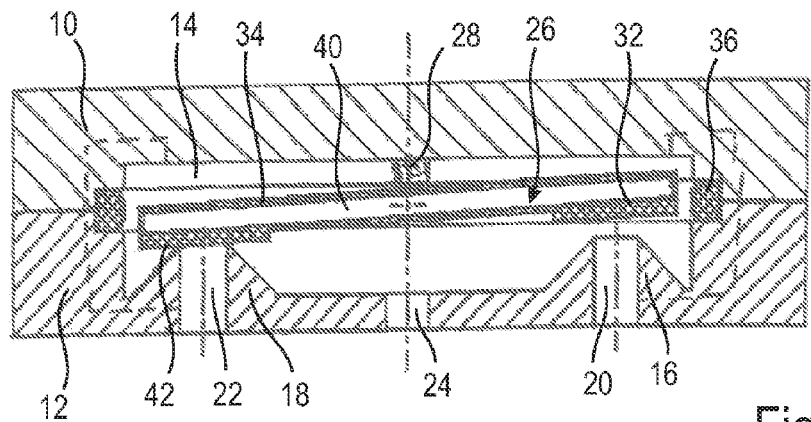
FIG. 1 is a cross-sectional view through a fluidic control element according to the invention.

FIG. 1 shows a fluidic control element in 3/2-way-function, which is part of a 3/2-way-valve.

The control element comprises a preferably flat, parallelepiped housing made up of two housing parts 10, 12 which are pressed against each other.

Formed between the housing parts 10, 12 is a fluid space 14 which is defined by recesses in the housing parts 10, 12.

Two sealing seats 16, 18, which are also referred to as valve seats, protrude into the fluid space 14. The sealing seats 16, 18 surround the orifices of associated flow channels 20, 22 which begin in the fluid space 14 or open into it.

The flow channels 20, 22 extend through the housing part 10 and are connected to a piping system (not shown). Same applies to a flow channel 24 which is formed without a valve seat and preferably opens into the fluid space 14 between the sealing seats 16, 18 or originates from it.

Provided in the fluid space 14 is a valve body 26 which is designed as a combined sealing and actuating element and comprises a two-armed lever which can be swiveled about an axle 28.

Figure 2:
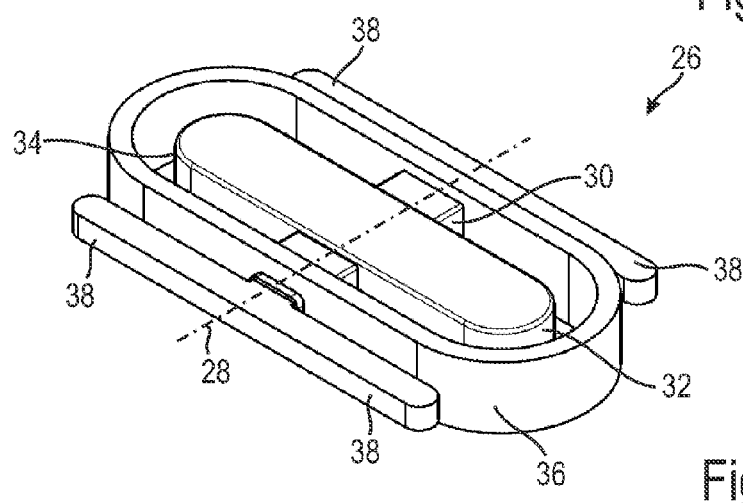
FIG. 2 is a perspective view of a valve body according to a first embodiment used in the control element according to the invention.

FIG. 2 illustrates the valve body 26 in more detail. The valve body 26 comprises a middle shaft portion 30 surrounding the axle 28, the two arms 32, 34 originating from said shaft portion. Further, the valve body 26 comprises a closed surrounding sealing ring 36 originating from the shaft portion 30 and extending at a lateral distance from the two-armed lever.

The shaft portion 30 extends as far as to outside the sealing ring 36 and has its axial ends each provided with a one- or two-armed actuation arm 38 which is angled relative to the axle 28.

The valve body 26 is a sandwich-type component with a load-carrying core 40 preferably made of sheet metal or hard plastic and surrounded in portions by an elastic sealing sheath made of plastic.

Figure 3:
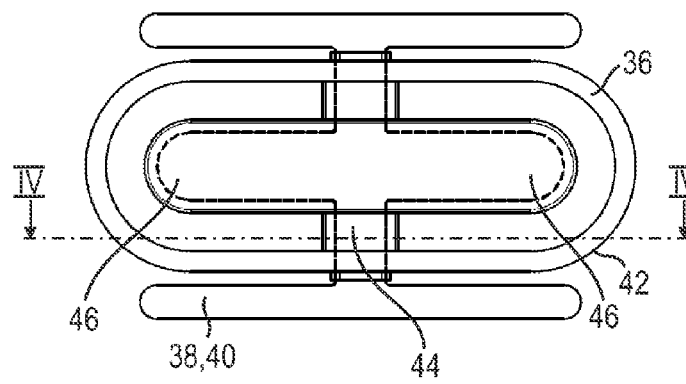
FIG. 3 is a top view of the control element according to FIG. 2.

According to FIG. 3, the core 40 comprises the actuation arms 38 in whose region the core 40 is not surrounded by the sealing sheath 42, a shaft 44 connecting the actuation arms 38 to each other, as well as two tongue-like protrusions 46 protruding centrally from the shaft 44 in opposite directions and forming the core 40 of the two lever arms 32, 34. The shaft 44 and the protrusions 46 are completely surrounded by the elastic plastic material of the sealing sheath 42 so that they are embedded therein.

Apart from the region in which the sealing ring 36 receives the shaft 44, the sealing ring 36 has no embedded reinforcement, i.e. it is realized without any core 40 and hence is functionally identical to an elastic O-ring or the like.

On the side facing the respective sealing seat 16, 18, the sealing sheath 42 may be formed with a somewhat higher thickness, as can be seen in FIG. 1. For simplification, the core 40 is not illustrated in FIG. 1. It is to be seen, however, that the sealing ring 36 is received in recesses in the housing parts 10, 12 and defines the external limitation of the fluid space 14 in the region of the parting plane between the housing parts 10, 12. The sealing ring 36 is axially compressed between the housing parts 10, 12.

By the introduction of a torque, for instance by means of electromagnetic actuators acting on the actuation arms 38, the two-armed valve body 26 is swiveled between two end positions.

In the embodiment according to FIG. 1, the valve body 26 is swiveled such that the arm 34 closes the sealing seat 18. Thus, a fluid may flow into the fluid space 14 via the channel 20 and flow out again via the channel 24. Vice versa, in the other end position a fluid may flow into the control element via the channel 22 and flow out again via the channel 24. In any intermediate position in which the two sealing seats 16, 18 are open, the fluid can be mixed very precisely in quantitative terms.

Having clamped the sealing ring 36 between the housing parts 10, 12, the elastic sealing sheath 42 acts like a kind of bearing for the core 40 moving therein, in particular in the region of the shaft 44.

Figure 4:
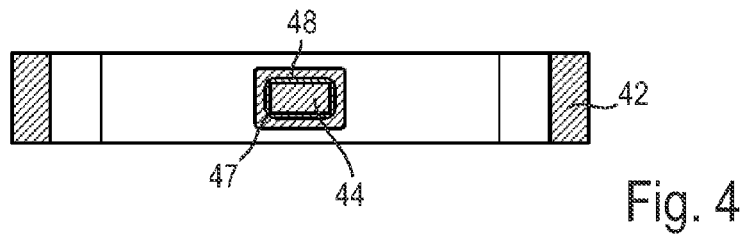
FIG. 4 is a sectional view along the line IV-IV in FIG. 3.

FIG. 4 illustrates a section through the shaft portion 30. The shaft 44 has an essentially rectangular cross-section with rounded corners or borders 47. This rounded design of the corners or borders 47 may be produced in different ways.

To give an example, the core 40 in the region of its borders and corners can be rounded by a mechanical, chemical and/or electrochemical or physical post-processing. This rounding process is carried out at least in the region of the shaft 44 in which the elastic sealing sheath is embedded.

Another possibility of rounding is to provide the shaft 44 with an external coating 48. Thus, the shaft 44 has a multi-layer design. The coating 48 is realized such that—despite the sharp-edged inner metal or plastic core—the border of the resulting multi-layer core is rounded so that there are no sharp corners or edges adjoined by the elastic material. In this region, the core 40 has a multi-layer design as already stated, comprising the load-carrying inner core and the covering whereby the shaft 44 has an outer circumference which is rounded.

Figure 5:
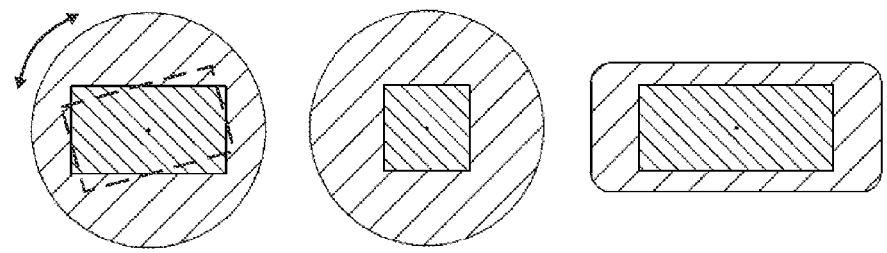
FIG. 5 shows various variants of the cross-section of the valve body core which is used with the invention.

FIG. 5 lists most various options for realizing the round shaft 44 as examples. The shaft may be realized without any covering or coating by exhibiting a completely round outer geometry, in the left embodiment an oval one, a circular cross-section or any other, for instance rectangular cross-section with greatly rounded edges. As an alternative to this, the outer surface may also be formed by a covering of the inner core, with the option of realizing the covering as a coating, a part attached by injection molding or as a separately manufactured part which is fastened thereto. By way of example, the inner core can still be realized so as to be rectangular and have a sharp-edged design. These inner cores are illustrated in FIG. 5 with broken lines and represent examples only.

Figure 6:
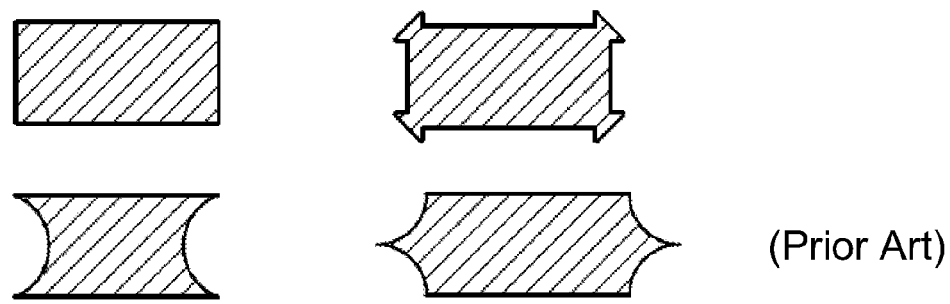
FIG. 6 shows various variants of the cross-section of the valve body core used in prior art.

FIG. 6 shows the cross-sections of shafts as usual hitherto in prior art, which were uncoated and formed a portion of a punched part. It can be seen that the cross-sections were realized without rounded edges, even had sharp-edged corners in part, in order to ensure a good anchoring and a form-fitting embedding in the circumferential direction within the sealing sheath.

Figure 7:
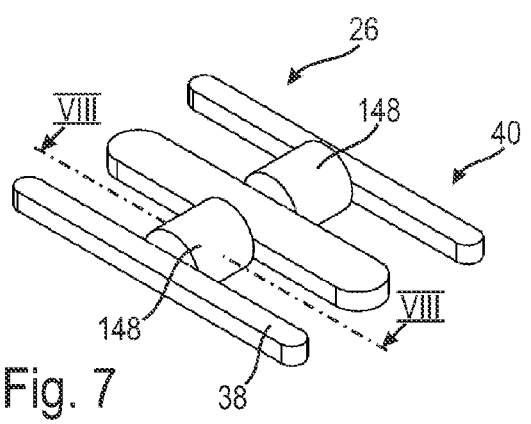
FIG. 7 is a perspective view through a second embodiment of the valve body core used with the invention.
Figure 8:
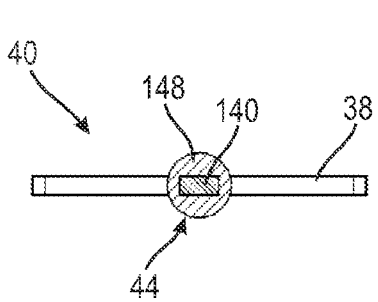
FIG. 8 is a sectional view through the core of the valve body according to FIG. 7 along line VIII-VIII.

FIG. 7 shows a further embodiment of the core 40 of the valve body according to the invention, in which a sleeve-like covering 148 is provided in the region where the shaft 44 passes through the sealing ring (not shown) realized as in FIG. 3. Here again, the shaft has a multi-layer design, comprising an inner core 140 which, for instance, has not been machined and is sharp-edged and has a rectangular cross-section (see FIG. 8), and a covering 148 made of a plastic material and exhibiting a rounded, here circular outer shape.

The covering 148 is produced in particular by means of insert-molding the inner core 140 or also by applying a two-part sleeve by gluing. The sealing sheath which will surround the shaft 44 as well as the two-armed lever, is produced in a next step by vulcanizing or insert molding.

With this embodiment, too, the core 40 within the fluid space 14 is completely surrounded by the sealing sheath. As an alternative to this, it is also possible, of course, that only portions of the core 40 are embedded in the elastomeric material.

Figure 9:
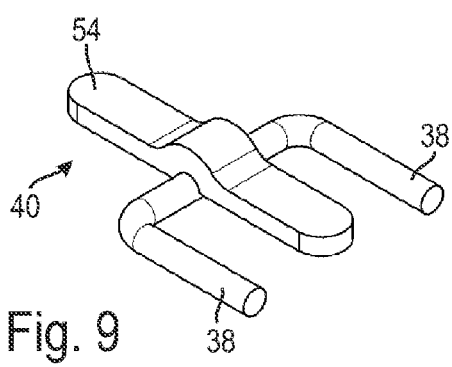
FIG. 9 is a third embodiment through a valve body core used with the invention.
Figure 10:
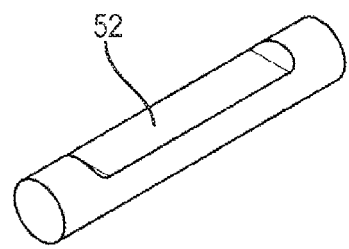
FIG. 10 shows the shaft which is used with the core according to FIG. 9, only the middle region of the shaft being shown.

In the embodiment according to FIG. 9, the core 40 has a two-part design, comprising a U-shaped wire including the shaft 44 and the actuation arms 38 and exhibiting a round, in particular circular cross-section. The wire preferably has, but not necessarily, a flattened portion 52 (see FIG. 10) in the region of the shaft 44. A two-part lever 54 is either separately produced beforehand and then is fastened to the wire, or the lever 54 is fastened to the wire in the course of the injection molding process. The flattened portion 52 serves for improving the bond and form-fitting embedding in the circumferential direction so that the moment applied via the actuation arms 38 is passed into the two-armed lever 54 in form-fitting manner.

The embodiment of the valve body 26 according to FIGS. 11 to 13 essentially corresponds to the previous embodiments so that only the differences have to be elaborated in the following. Here again, the core 40 is realized as a punched part or plastic part surrounded by a sealing sheath comprising a sealing ring 36. Here too, the two-armed lever and the shaft 44 are completely embedded in the elastomeric material within the fluid space 14 and in the region of the sealing ring 36. Laterally outside the sealing ring 36, the shaft 44 is exposed, for example, i.e. is not embedded in elastomeric material, which would also be possible.

Unlike the embodiments which have been described so far, the actuation arms 38 projecting from the same side of the axle 28 are connected with each other in pairs by a bridge 56.

In the illustrated embodiment, the bridge 56 essentially follows the shape of the sealing ring 36 so that a gap 58 occurs between the sealing ring 36 and the bridge 56 as well as the actuation arms 38.

In the exemplary embodiment which is shown, the load-carrying core 40 thus has the shape of the letter omega, and the tongue-like protrusions 46 at its middle leg protruding downwards or upwards.

The outer borders of the core 40 are laterally angled and define a stabilization rib 60. In the design of the core 40 as a punched sheet metal part, the stabilization ribs 60 are merely produced by bending.

Figure 11:
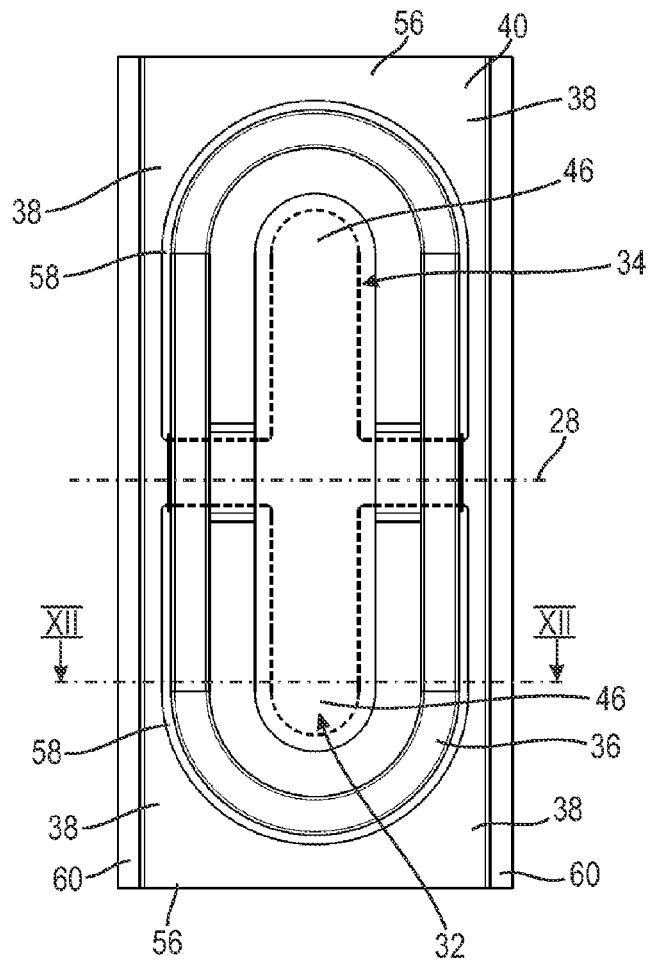
FIG. 11 is a top view of a further embodiment of the valve body used with the invention.

A further special aspect of the embodiment according to FIG. 11 which, however, is not limited to the special shape of the core 40, consists in that the sealing ring 36 has a self-reinforcing geometry.

Figure 12:
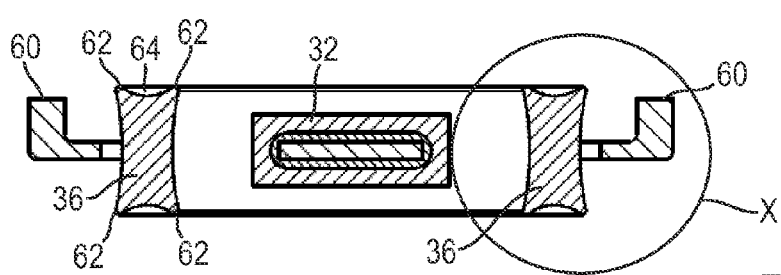
FIG. 12 is a sectional view through the valve body according to FIG. 11 along line XII-XII.
Figure 13:
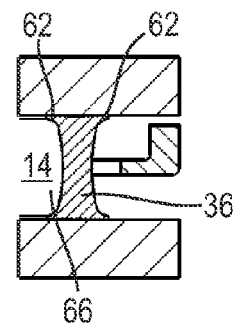
FIG. 13 is an enlarged view of the framed region designated with X in FIG. 12 in the installed state.

FIG. 12 shows that the sealing ring 36 has laterally protruding (i.e. protruding in axial direction) beads 62, in the cross-section towards its outer surfaces which come into contact with the housing parts 10, 12. A depression 64 may be present between neighboring beads 62, but this is not compulsory.

In the clamped state (see FIG. 13), the sealing ring 36 will be deformed such that the beads 62 protrude laterally, i.e. inwards toward the fluid space 14 and optionally towards outside. This results in an undercut 66 by the fluid applying a force on the beads 62 which presses the beads 62 against the surface of contact on the housing parts 10, 12 even more powerful. Thus, a self-reinforcing effect is achieved.

Figure 14:
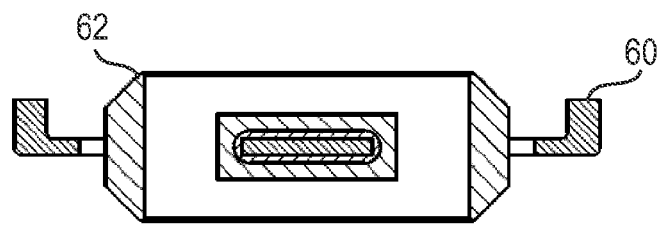
FIG. 14 is a sectional view through a further valve body used with the invention.
Figure 15:
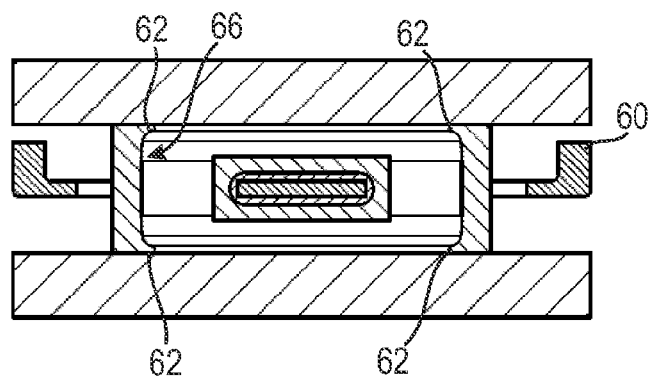
FIG. 15 is a sectional view through the valve body according to FIG. 14 in the installed state.

In the embodiment according to FIGS. 14 and 15, a bead 62 is realized which in the unloaded state (see FIG. 14) projects upward and downward on the inner side of the sealing ring 36. In the clamped state (see FIG. 15), the elastomeric material is deformed such that an inwardly oriented bead 62 will be produced which in turn creates the undercut 66 by pressure fluid providing for the self-reinforcing sealing effect.

Figure 16:
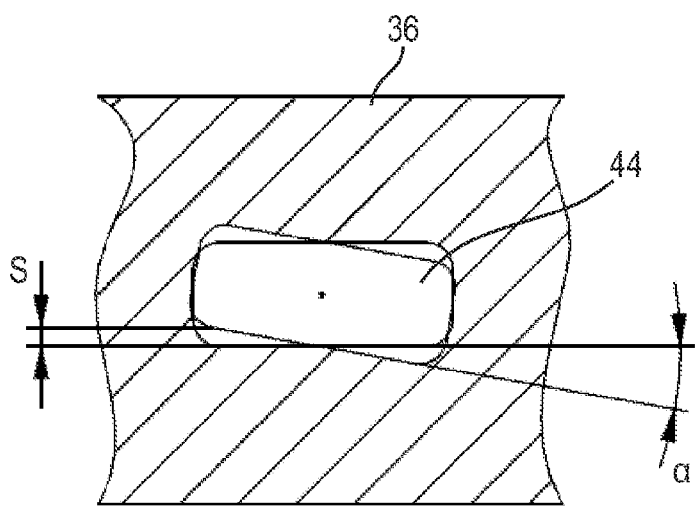
FIG. 16 is an enlarged detailed cross-sectional view through the valve body in the region of the shaft in the basic state and in a deflected state.

It is to be seen in FIG. 16 that the shaft 44 in case of a deflection S and a pivoting angle α changes from a horizontal orientation related to FIG. 16 to a swiveled orientation so that the elastomeric material will be deformed in the region of the sealing ring 36. However, the round outer geometry of the shaft 44 makes provision that the elastomeric material does not tear and come off from the shaft so that sealing problems could arise.

The invention claimed is:

1. A fluidic control element comprising:
a housing including at least two housing parts, a fluid space being formed between the housing parts and at least first and second flow channels each comprising a sealing seat opening into said fluid space;
a two-armed lever which is configured to swivel in the fluid space to provide a combined sealing and actuating element, wherein each arm of the two-armed lever is configured to open and close one of the first and second flow channels; and
a valve body comprising:
a load-carrying core including a shaft mounted in the housing; and
an elastic sealing sheath surrounding the core in sections, the sealing sheath comprising a sealing ring which is clamped between the housing parts and surrounds the lever arms, wherein a region of the shaft is embedded in the sealing ring such that a surrounding portion of the sealing ring deforms about the region of the shaft when the two-armed lever swivels, the shaft being rounded at least in the region of the shaft that is embedded in the sealing ring.

2. The control element according to claim 1, wherein all portions of the shaft which are situated within the sealing sheath and adjoin the sealing sheath are realized so as to have no sharp edges.

3. The control element according to claim 1, wherein the shaft has one of rounded edges and a round outer geometry at least in the region which is embedded within the sealing ring.

4. The control element according to claim 1, wherein all portions of the core which are situated within the sealing sheath and adjoin the sealing sheath are realized so as to have no sharp edges and comprise one of rounded edges and round outer contours.

5. The control element according to claim 1, wherein the core comprises protrusions which originate from the shaft and define the lever arms.

6. The control element according to claim 5, wherein the protrusions are embedded in the sealing sheath on all sides.

7. The control element according to claim 1, wherein at least one actuating arm is formed on the shaft outside the fluid space.

8. The control element according to claim 7, wherein the at least one actuating arm comprises an angled stabilization rib.

9. The control element according to claim 1, wherein the core is a punched part.

10. The control element according to claim 1, wherein the core is one of a punched sheet metal part, a bent sheet metal part and a plastic injection-molded part.

11. The control element according to claim 1, wherein the borders of the core are rounded at least one of mechanically, chemically and/or electrochemically.

12. The control element according to claim 1, wherein the shaft has a multi-layered design in the region of the passage through the sealing ring, by applying an externally rounded covering to a load-carrying inner core.

13. The control element according to claim 1, wherein the sealing sheath is applied to the core by one of insert molding and vulcanizing.

14. The control element according to claim 1, wherein the sealing ring has a self-reinforcing sealing geometry comprising beads projecting against a surface of contact with the housing parts.

15. The control element according to claim 1, wherein the shaft is additionally rounded in a region that adjoins the sealing ring.

16. The control element according to claim 1, wherein the fluid space comprises a shared fluid space that fluidly couples the first and second flow channels, and wherein both the first and second flow channels are configured to release fluid into the shared fluid space.

17. The control element according to claim 16, wherein a third flow channel opens into the shared fluid space, and wherein the fluid that is released from the first and second flow channels exits the shared fluid space via the third flow channel.

18. The control element according to claim 1, wherein the shaft is formed as a multi-layer design, and wherein a material bond is provided between the sealing ring and an outer layer of the shaft.

19. The control element according to claim 18, wherein the outer layer comprise an external coating or a sleeve-like covering.

20. The control element according to claim 1, wherein the sealing ring and the sealing sheath are formed together as a one-piece construction.

21. An apparatus, comprising:
a housing including at least two housing parts, wherein a shared fluid space is formed between the housing parts, and wherein at least first and second flow channels open into the shared fluid space;
means for controlling a flow of fluid released from the first and second flow channels into the shared fluid space, wherein the means for controlling flow is located in the shared fluid space;
a shaft operably connected to the means for controlling flow; and
a sealing ring located between the housing parts, wherein the sealing ring surrounds the means for controlling flow, wherein a region of the shaft is embedded in the sealing ring such that a surrounding portion of the sealing ring deforms about the region of the shaft when the means for controlling changes the flow of fluid into the shared fluid space, and wherein the shaft is rounded at least in the region that is embedded in the sealing ring.

22. The apparatus according to claim 21, further comprising:
a load carrying core, wherein the shaft forms part of the load carrying core; and
an elastic sealing sheath surrounding the load carrying core in sections, wherein the shaft is at least partially embedded in both the elastic sealing sheath and the sealing ring.

23. The apparatus according to claim 22, wherein the sealing ring and the sealing sheath are formed together as a one-piece construction.

24. The apparatus according to claim 21, wherein a portion of the shaft located adjacent to the sealing ring is also rounded.

25. The apparatus according to claim 21, wherein a third flow channel opens into the shared fluid space, and wherein the fluid that is released from the first and second flow channels exits the shared fluid space via the third flow channel.

26. The apparatus according to claim 21, wherein a material bond is provided between the sealing ring and the shaft.

27. The apparatus according to claim 26, wherein the shaft is formed as a multi-layer design including an outer layer, and wherein the material bond is provided between the sealing ring and the outer layer of the shaft.

28. The apparatus according to claim 27, wherein the outer layer comprises an external coating or a sleeve-like covering.

\* \* \* \* \*